United States Patent [19]

Grasso et al.

[11] Patent Number: 5,104,224
[45] Date of Patent: Apr. 14, 1992

[54] RING LASER GYROSCOPE HAVING REDUCED SENSITIVITY TO MAGNETIC EFFECTS

[75] Inventors: Mark S. Grasso, Carlstadt; Joseph P. Ficalora, Oak Ridge, both of N.J.

[73] Assignee: Allied-Signal Inc., Morris Township, Morris County, N.J.

[21] Appl. No.: 495,862

[22] Filed: Mar. 19, 1990

[51] Int. Cl.⁵ .............................................. G01C 19/66
[52] U.S. Cl. ..................................... 356/350; 372/94
[58] Field of Search .................... 356/350; 372/33, 94

[56] References Cited

U.S. PATENT DOCUMENTS

| | | | |
|---|---|---|---|
| 4,686,683 | 8/1987 | Martin | 356/350 X |
| 4,705,398 | 11/1987 | Lim et al. | 356/350 |

Primary Examiner—Vincent P. McGraw
Attorney, Agent, or Firm—Howard G. Massung; Robert A. Walsh

[57] ABSTRACT

A ring laser gyro is configured in accordance with a model whereby a closed line integral is evaluated along the optical path of the gyro so that reducing the integral by configuring the plasma discharge path of the gyro reduces the sensitivity of the gyro to magnetic effects.

6 Claims, 3 Drawing Sheets

RING LASER GYROSCOPE HAVING REDUCED SENSITIVITY TO MAGNETIC EFFECTS

BACKGROUND OF THE INVENTION

This invention relates generally to ring laser gyroscopes (gyros) and particularly to a ring laser gyro configured to be less sensitive to magnetic effects than would otherwise be the case.

Ring laser gyros generally feature a base of a ceramic material having a low coefficient of thermal expansion and passageways within the base which, together with mirrors, form a closed optical cavity for counterpropagating beams of coherent light. The base forms a sealed envelope containing a suitable gas under a low pressure in the closed optical cavity. Electrodes (anodes and cathodes) are disposed in communication with the optical cavity so that an electrical potential sufficient to support plasma excitation and lasing is maintained in the gas. As is well known in the ring laser gyro art, the laser has a gain section which is that portion of the closed optical cavity in which the electrodes, when energized, maintain a discharge in the ionized gas or plasma.

Ring laser gyros are sensitive to magnetic effects which tends to reduce their accuracy and thus affects their usefulness in many applications such as, for example, north seeking systems. Prior to the present invention, various gyro configurations have been used to reduce these magnetic effects. One such configuration of which the applicants herein are aware is discussed in U.S. Pat. No. 4,705,398 issued on Nov. 10, 1987 to Lim, et al. More often, magnetic sensitivity is reduced by appropriate shielding against magnetic effects. Magnetic shielding requires additional components, is cumbersome, adds to the cost of the gyro, and is otherwise disadvantageous.

SUMMARY OF THE INVENTION

This invention contemplates a ring laser gyro of the type described which is configured in accordance with a model. The model qualitatively equates magnetic sensitivity to the integral of a constant times $\omega$ times $B \cdot dL$, where $\omega$ is normalized plasma excitation current density, B is the magnetic field vector and $dL$ is a portion of the optical cavity. The model provides a closed line integral which is evaluated along the optical cavity of the gyro. Thus, a ring laser gyro can be configured so that the integral of $B \cdot dL$ around the optical cavity is reduced which therefore results in reduced sensitivity of the gyro to magnetic effects.

A gyro configuration configured in accordance with the aforenoted model avoids the use of magnetic shielding or complex structural configurations for reducing sensitivity to magnetic effects as would otherwise be the case, and is thus a distinct advantage over the prior art.

DETAILED DESCRIPTION OF THE INVENTION

Figure 1:
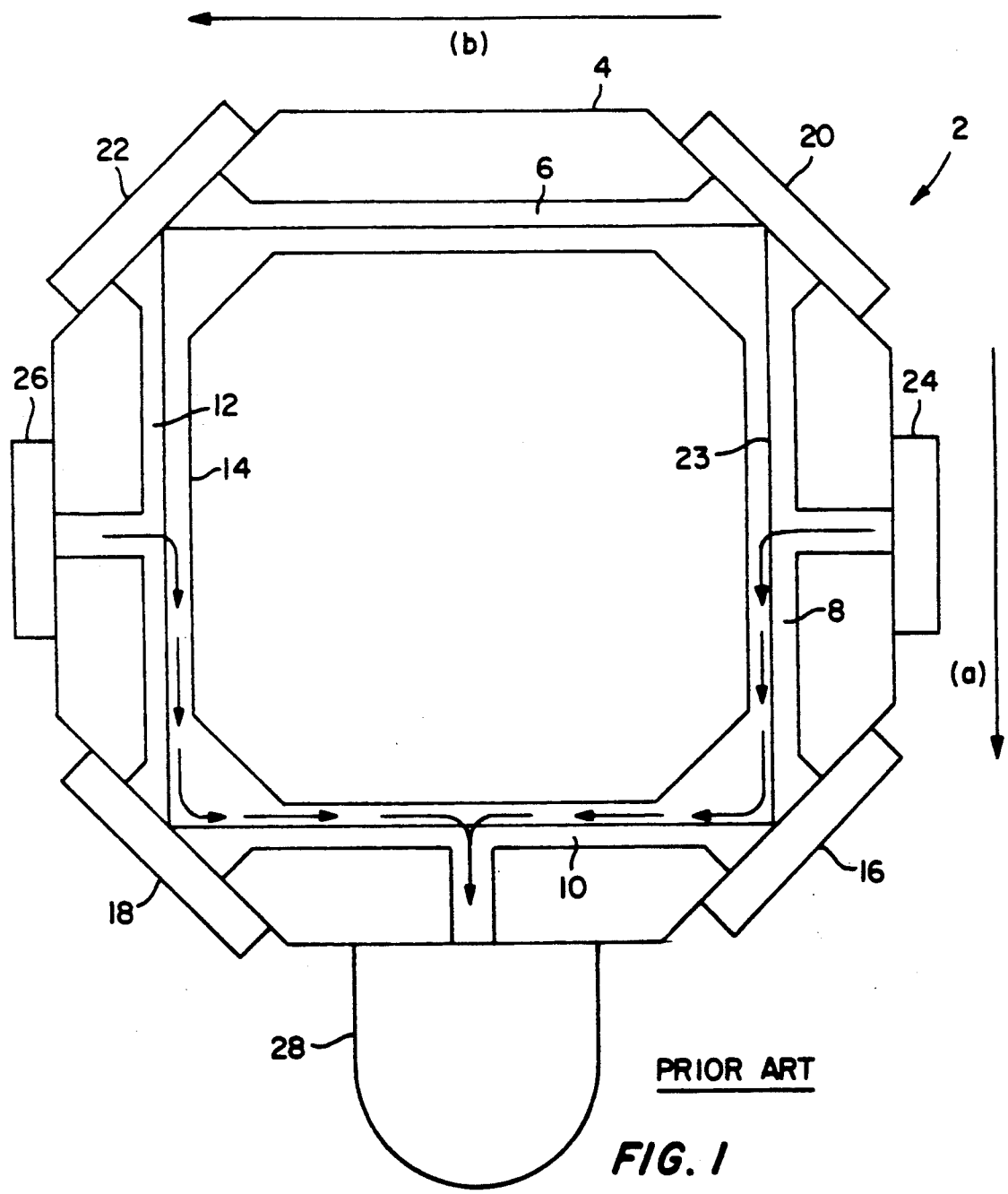
FIG. 1 is a diagrammatic representation showing, for purposes of illustration, a typical four sided ring laser gyro as is well known in the prior art.

With reference to FIG. 1, a prior art four sided ring laser gyro is designated by the numeral 2. Gyro 2 has a body 4 which is preferably of ceramic having a low coefficient of thermal expansion. Passageways 6, 8, 10 and 12 in body 4 form a closed cavity 14 for counterpropagating beams of coherent light.

Gyro 2 includes corner mirrors 16 and 18 at one of the extremities of each of the passageways 8 and 12, respectively. A readout mirror 20 is disposed at the opposite extremity of passageway 8 and a readout mirror 22 is disposed at the opposite extremity of passageway 12. The optical axis of the gyro extends around the four sides thereof and is designated by the numeral 23.

Base 4 forms a sealed envelope containing gas under a low pressure in optical cavity 14. A suitable gas for the purposes intended is the well known mixture of helium and neon. Electrodes are disposed in communication with optical cavity 14 so that an electrical potential sufficient to support excitation and lasing of the ionized gas or plasma may be maintained in the gas.

Thus, an electrode or anode 24 is disposed in communication with passageway 8 between mirror 16 and mirror 20, and an electrode or anode 26 is disposed in communication with passageway 12 between mirror 18 and mirror 22.

A cathode 28 is disposed in communication with passageway 10. Cathode 28 is in a cooperative arrangement with anodes 24 and 26 through passageways 8 and 12, respectively. In this connection, it will be understood that anodes 24 and 26 are disposed with relation to cathode 28 at locations in optical path 14 which are selected to provide a desired length for the gain section of the laser relative to the length of the entire optical cavity. As is well known in the laser gyro art, the laser gain section is that portion of optical cavity 14 in which electrodes when energized will maintain a discharge in the ionized gas or plasma. Balanced electrical voltages are applied between anodes 24 and 26 and cathode 28 to provide substantially equal and therefore balanced plasma excitation currents flowing in the laser gain section.

With continued reference to FIG. 1, ionized gas or plasma atoms flow in passageways 8, 10 and 12 in the direction indicated by the arrows substantially parallel to optical axis 23.

It will be understood that the ring laser gyro so far described is of the type well known in the art and only as much of the gyro as is required for an understanding of the present invention as will be hereinafter disclosed has been illustrated and described.

It has been found that the prior art gyro configuration shown in FIG. 1 has the disadvantage of being sensitive to magnetic effects. This tends to decrease the accuracy of the gyro so as to render it unsuitable for many applications. While magnetic shielding would overcome this disadvantage, it would also increase the complexity and cost of the gyro. The present invention reduces the aforenoted magnetic sensitivity by configuring a ring laser gyro in accordance with a qualitative model developed as will be next explained.

The magnetic sensitivity of a ring laser gyro can be measured by an appropriate test procedure. This is accomplished by disposing the gyro in the magnetic field of a Helmholtz coil, the same being well known in the electromagnetic art. FIG. 1 defines the gyro axes with respect to the magnetic field direction. That is to say, the gyro has an axis which has a high magnetic sensitivity as indicated by arrow (b) and an axis which has a low magnetic sensitivity as indicated by arrow (a).

Figure 2:
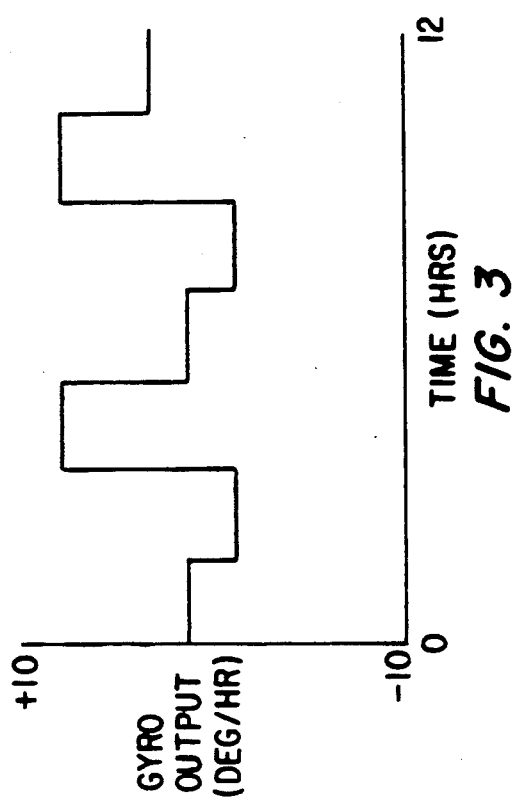
FIGS. 2–6 are graphical representations illustrating gyro test results used in developing a model for configuring a ring laser gyro having reduced sensitivity to magnetic effects.
Figure 3:
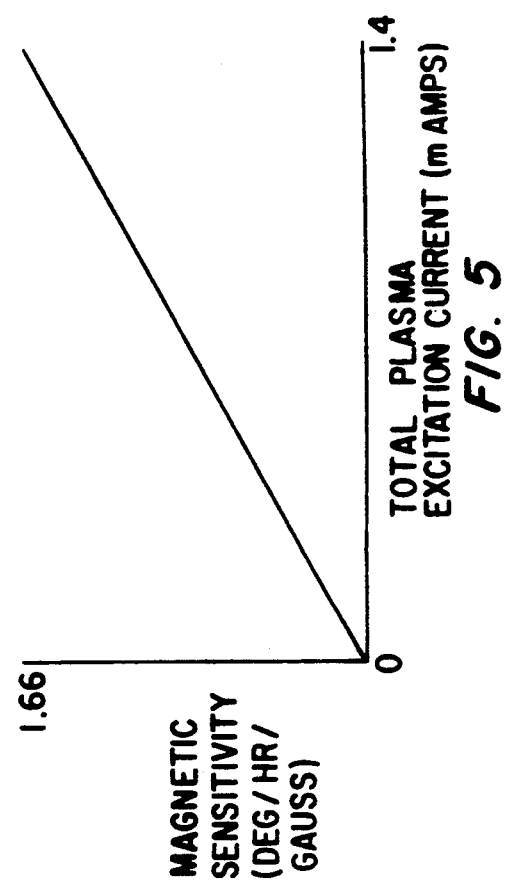

FIG. 2 is a graphical representation of magnetic field amplitude versus coil current. The magnetic field amplitude is measured where the center of the gyro is disposed. For test purposes, a two ampere current is used for providing a thirty-six gauss field amplitude as illustrated in the Figure. An automated testing procedure allows testing over an extended interval. FIG. 3 shows how a typical gyro output varies with time during the aforenoted test procedure.

Figure 4:
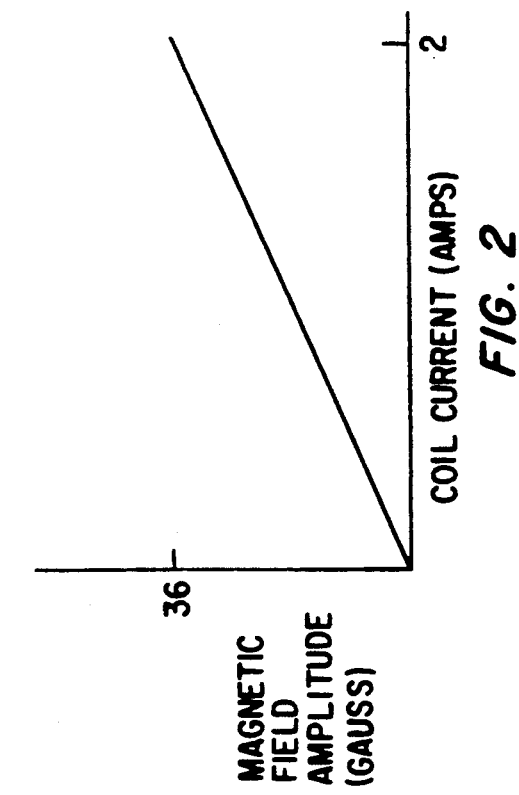

Magnetic sensitivity is the change in gyro bias divided by the change in field amplitude in degrees/hour/gauss. A large field amplitude is used to obtain more repeatable numbers and to give greater resolution for low magnetic sensitivity gyros. To verify that the magnetic sensitivity of a gyro is independent of the magnetic field amplitude, a gyro was tested over a range of magnetic field amplitudes. FIG. 4 shows a linear relationship of magnetic sensitivity to coil current and hence the validity of using a large field amplitude.

Figure 5:
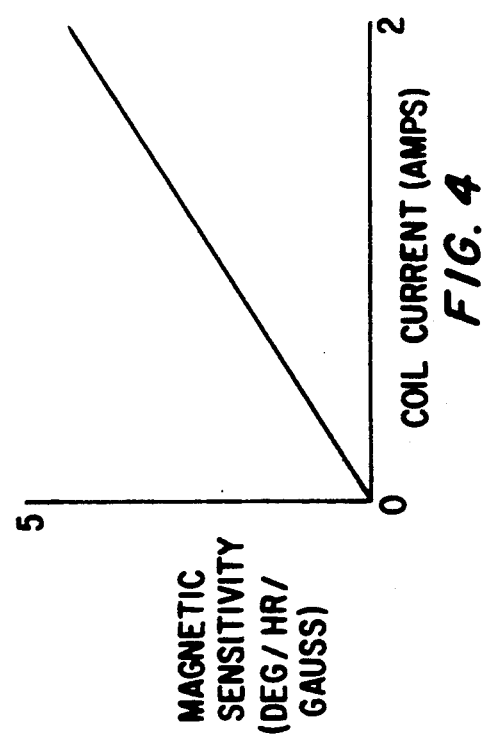

The graphical representation of FIG. 5 shows a linear relationship between total plasma excitation (discharge) current and magnetic sensitivity. This indicates that magnetic sensitivity is not dependent on plasma excitation (discharge) current direction. To confirm this, gyros were tested with only one leg discharging. It was expected that the gyro would show one sensitivity with one leg discharging and the same sensitivity with the other leg discharging. If the discharge direction was important, the gyro would show different sensitivities (one positive and one negative) during this test, the same not being the case.

Figure 6:
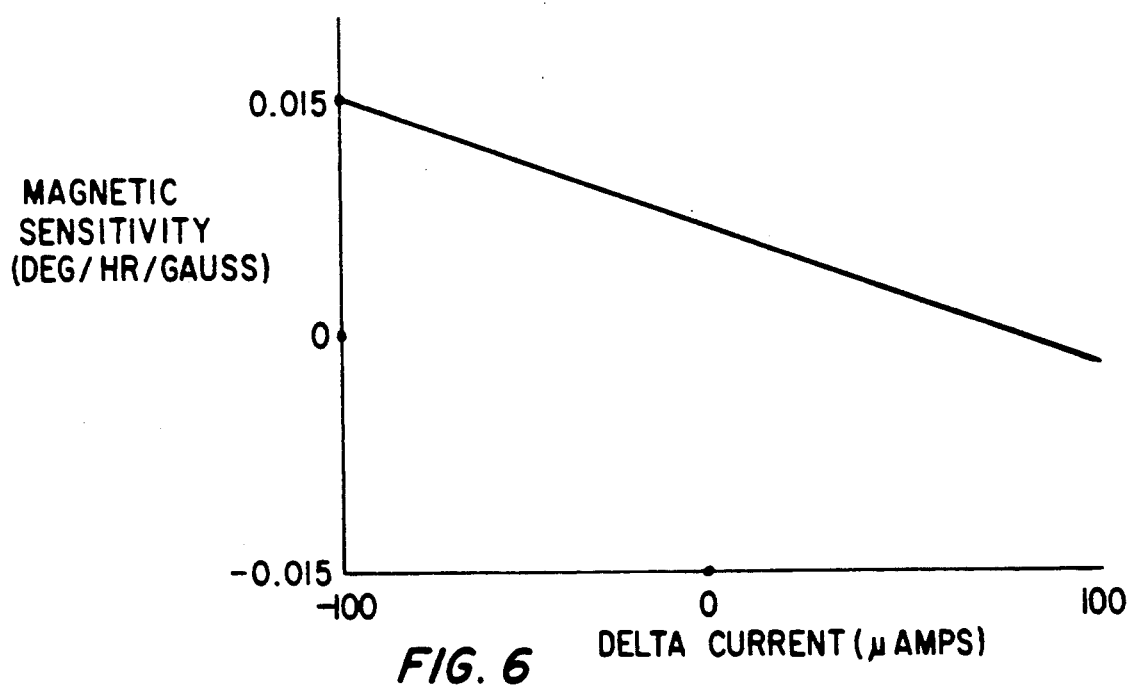

Tests were next performed relating to the magnetic sensitivity along the axis of symmetry of the gyro (cathode-aperture). The results of these tests are illustrated in FIG. 6, with delta current being the difference between the discharge current in the two legs of a tested gyro.

The results of the aforenoted tests are qualitatively expressed by the following model $$\text{Mag. Sen.} = \int C\omega B \cdot dL.$$

where
C is a constant;
$\omega$ is the normalized plasma excitation current density; and
B is the magnetic field Vector with the closed line integral $\omega B \cdot dL$ being evaluated along the optical path or cavity L.

The model is applied to the aforementioned test procedure with the magnetic field along the cathode-aperture axis of the gyro. To evaluate the integral above, the line integral is divided into the sum of four integrals. The first integral is where $\omega$ is zero along the optical path length. This corresponds to all of the back bore and the two areas by the gyro mirrors where the plasma turns the corner (see FIG. 1). For all of this, the integral is zero. The second integral is along the discharge near the gyro cathode. This has no contribution because B·dL is zero since B is perpendicular to dL. This leaves the two integrals for the two legs of discharge by the gyro anodes. They have opposite signs since B·dL is negative for one of them. Ideally, for matched currents in each gyro leg and no frame asymmetries, gyro magnetic sensitivity approaches zero since the integrals are nearly equal in amplitude with opposite signs. Due to frame asymmetries, the two integrals do not cancel completely. By correct choice of delta current, the integral of B·dL and therefore the magnetic sensitivity approaches zero. This is shown in FIG. 6.

For the magnetic field direction from anode to anode, the sensitivity comes from the gain bore by the cathode whose integral is other than zero. All other integrals are zero for this orientation. The model then predicts that the magnetic sensitivity will be dependent on the total plasma excitation current in the gyro, agreeing with the test results aforenoted.

Due to beam misalignments in the gain profile and out-of-plane distortions, the model only gives qualitative results. However, the model designates a configuration for a gyro with reduced sensitivity to magnetic effects as will now be discerned.

Figure 7:
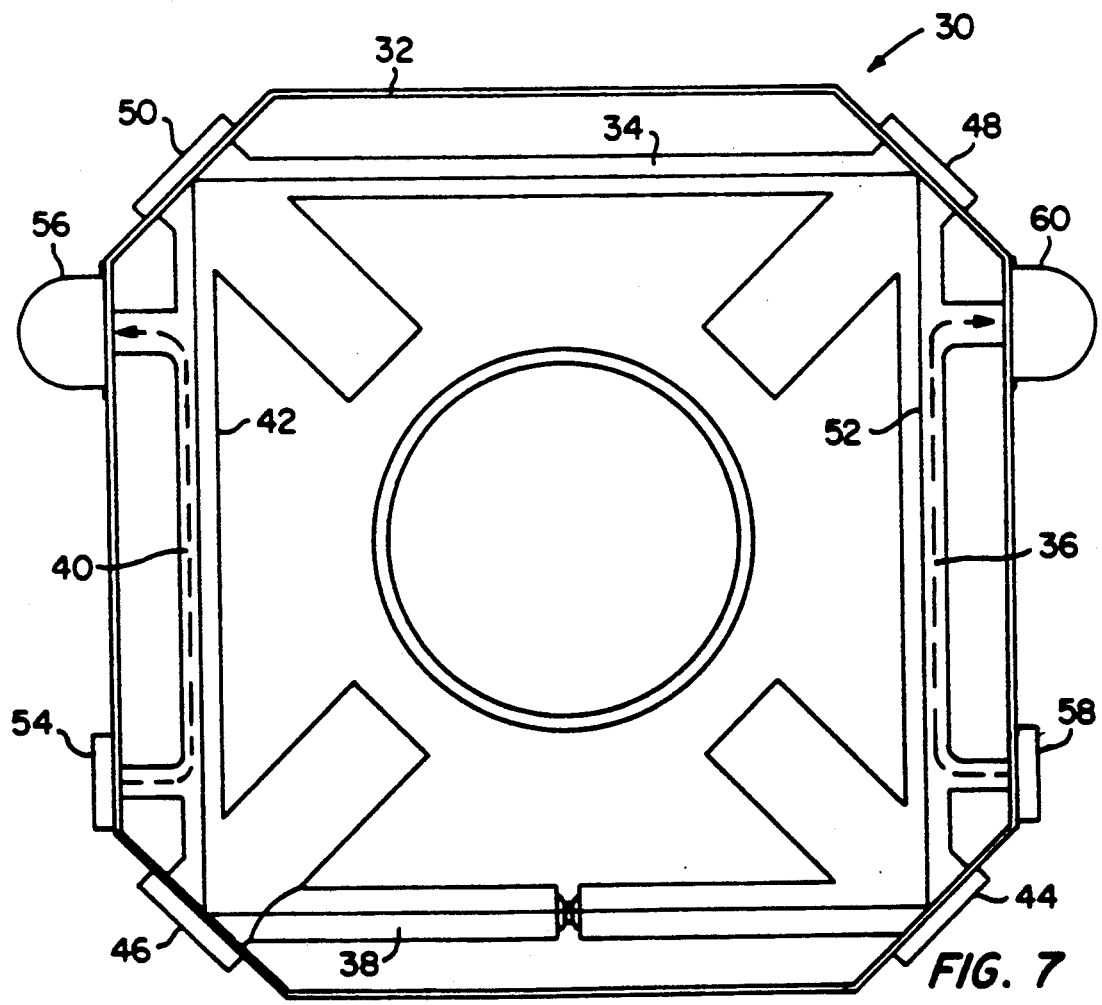
FIG. 7 is a diagrammatic representation illustrating a ring laser gyro configured in accordance with the invention.

In accordance with the above, any ring laser gyro configuration such that the integral of $\omega B \cdot dL$ around the optical path is reduced will result in a gyro having reduced sensitivity to magnetic effects. An example of a ring laser gyro utilizing the aforenoted criteria in a four sided gyro configuration is shown in FIG. 7. The plasma discharge is confined to the two opposite legs of the gyro resulting in the integral of $\omega B \cdot dL$ being reduced.

FIG. 7 illustrates a four sided ring laser gyro designated by the numeral 30. Gyro 30 is in many respects similar to gyro 2 shown in FIG. 1. That is to say, gyro 30 has a body 32 which is preferably of ceramic having a low coefficient of thermal expansion and body 32 has passageways 34, 36, 38 and 40 which form a closed cavity 42 for counterpropagating means of coherent light.

Gyro 30 includes corner mirrors 44 and 46 at one of the extremities of each of the passageways 36 and 40, respectively, and mirrors 48 and 50 at the opposite extremities of passageways 36 and 40, respectively. The optical axis of gyro 30 extends around the four sides thereof and is designated by the numeral 52.

As with gyro 2, base 32 forms a sealed envelope containing gas under a low pressure in optical cavity 42. Electrodes are disposed in communication with optical cavity 42 so that an electrical potential sufficient to support excitation and lasing of the ionized gas or plasma may be maintained in the gas.

An electrode or anode 54 is disposed in passageway 40 between mirrors 46 and 50, but near mirror 46. An electrode or cathode 56 is disposed in passageway 40 between mirrors 46 and 50, but near mirror 50.

An electrode or anode 58 is disposed in passageway 36 between mirrors 44 and 48, but near mirror 44 and an electrode or cathode 60 is disposed in passageway 36 between mirrors 44 and 48 but near mirror 48.

Thus, the configuration of ring laser gyro 30 is such that two opposite and parallel legs are provided and plasma discharge as indicated by the arrows is confined to said two opposite and parallel legs resulting in the integral of $\omega B \cdot dL$ being reduced in accordance with the model developed as heretofore described. That is to say, the configuration of FIG. 7 is such that the integral of $\omega B \cdot dL$ around optical path 42 is reduced to result in gyro 30 having a reduced sensitivity to magnetic effects.

It will be understood that the opposite and parallel discharge leg arrangement illustrated in FIG. 7 is only one gyro configuration which will satisfy the qualitative model developed as aforenoted. Other configurations resulting in a reduction in the integral of $\omega B \cdot dL$ around the optical path to satisfy the model are within the contemplation of the invention.

Thus, the invention as herein disclosed develops a qualitative model to which ring laser gyros may be configured wherein the closed line integral $\omega B \cdot dL$ is evaluated along the optical path of the gyro such that the result is reduced. That is to say, the plasma discharge path of the gyro is configured for reducing the integral which reduces the sensitivity of the gyro to magnetic effects. Due to beam misalignments and out of plane distortions, the model only gives qualitative results but does designate a ring laser gyro configuration for reduced magnetic sensitivity.

With the aforenoted description of the invention in mind, reference is made to the claims appended hereto for a definition of the scope of the invention.

What is claimed is:

1. A ring laser gyro comprising:

a base;

passageways within the base which, together with mirrors, form a closed optical cavity for counterpropagating beams of coherent light traveling around an optical axis;

the base forming a sealed cavity containing a gas under a low pressure in the closed optical cavity;

electrodes disposed in communication with the closed optical cavity so that when said electrodes are energized an electrical current sufficient to support plasma excitation is maintained in the gas;

the electrodes and the closed optical cavity arranged so that a closed line integral evaluated along the optical cavity is reduced whereby the sensitivity of the ring laser gyro to magnetic effects is reduced; and said closed line integral being in accordance with $\int C\omega B \cdot dL$, where C is a constant, $\omega$ is the normalized plasma excitation current density, B is a magnetic field vector, L is the length of the optical cavity and dL is a portion of said optical cavity length.

2. A ring laser gyro, comprising:

a base;

passageways within the base which, together with mirrors, form a closed optical cavity for counterpropagating beams of coherent light traveling around an optical axis;

the base forming a sealed cavity containing a gas under a low pressure in the closed optical cavity;

electrodes disposed in communication with the closed optical cavity so that when said electrodes are energized an electrical current sufficient to support plasma excitation is maintained in the gas; and the electrodes and the closed optical cavity arranged whereby the sensitivity of the gyro to magnetic effects is equated to the integral of a constant times the normalized plasma excitation current times a magnetic field vector along a portion of the optical cavity, with said integral being reduced to reduce the sensitivity of the gyro to magnetic effects.

3. A ring laser gyro as described by claim 2, wherein:

the sensitivity of the gyro to magnetic effects is qualitatively equated to the integral.

4. A ring laser gyro, comprising:

a base;

a passageway within the base which, together with mirrors, form a closed optical cavity for counterpropagating beams of coherent light traveling around an optical axis;

the base forming a sealed cavity containing a gas under a low pressure in the closed optical cavity;

electrodes disposed in communication with the closed optical cavity so that when said electrodes are energized an electrical current sufficient to support plasma excitation is maintained in the gas;

the electrodes and the closed optical cavity arranged in accordance with a model expressed as a closed line integral evaluated along the optical path of the gyro so that reducing the integral by configuring the plasma discharge path of the gyro reduces the sensitivity of the gyro to magnetic effects; and said closed line integral being in accordance with $\int C\omega B \cdot dL$, where C is a constant, $\omega$ is the normalized plasma excitation current density, B is a magnetic field vector, L is the length of the optical cavity and dL is a portion of said optical cavity length.

5. A method for reducing the sensitivity of a ring laser gyro to magnetic effects, wherein said gyro has a sealed cavity containing a gas under pressure in a closed optical cavity and electrodes disposed in communication with the closed optical cavity so that when said electrodes are energized an electrical current sufficient to support plasma excitation is maintained in the gas, said method comprising:

arranging the electrodes and the closed optical cavity in accordance with a closed line integral;

expressing the closed line integral as $\int C\omega B \cdot dL$, where C is a constant, $\omega$ is the normalized plasma excitation current density, B is a magnetic field vector, L is the length of the optical cavity and dL is a portion of said optical cavity length;

equating the sensitivity of the gyro to magnetic effects to the closed line integral;

evaluating the closed line integral along the optical cavity; and reducing the closed line integral for reducing the sensitivity of the gyro to magnetic effects.

6. A method as described in claim 5, wherein:

equating the sensitivity of the gyro to magnetic effects to the closed line integral includes qualitatively equating the sensitivity of the gyro to magnetic effects to the closed line integral.

* * * * *